US012244781B2

(12) United States Patent
Nakamura (10) Patent No.: US 12,244,781 B2
(45) Date of Patent: Mar. 4, 2025

(54) INFORMATION PROCESSING SYSTEM, SERVER, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Takashi Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 606 days.

(21) Appl. No.: 17/377,340

(22) Filed: Jul. 15, 2021

(65) Prior Publication Data

US 2022/0311905 A1 Sep. 29, 2022

(30) Foreign Application Priority Data

Mar. 25, 2021 (JP) .................................. 2021-052099

(51) Int. Cl.
*H04N 1/04* (2006.01)
*H04L 9/40* (2022.01)
*H04N 1/44* (2006.01)

(52) U.S. Cl.
CPC ....... *H04N 1/4433* (2013.01); *H04L 63/0272* (2013.01); *H04L 63/0823* (2013.01)

(58) Field of Classification Search
USPC ...................................................... 358/1.14
See application file for complete search history.

(56) References Cited

U.S. PATENT DOCUMENTS

| | | |
|---|---|---|
| 9,019,535 B1 | 4/2015 | Hansen |
| 10,282,151 B2 | 5/2019 | Suzuki |

(Continued)

FOREIGN PATENT DOCUMENTS

| | | |
|---|---|---|
| AU | 2013341125 | 5/2015 |
| JP | 2004274448 | 9/2004 |

(Continued)

OTHER PUBLICATIONS

"Search Report of Europe Counterpart Application", issued on Feb. 10, 2022, p. 1-p. 8.

(Continued)

*Primary Examiner* — Cheukfan Lee
(74) *Attorney, Agent, or Firm* — JCIPRNET (57) ABSTRACT

An information processing system includes a first processor mounted on a server connected to a local area network of an organization to which a user belongs, and a second processor mounted on an information processing apparatus provided outside the local area network, in which the first processor is configured to in a case of relaying process request information addressed to the information processing apparatus, the process request information including data which is a target of a process, and process information including identification information on the process, information specifying a request source of the process, and identification information on the information processing apparatus which is a request destination of the process, associate the identification information on the process with the identification information on the information processing apparatus included in the process request information to generate processing management information, and register the generated processing management information in a process management information storage unit, and return execution permission information indicating that execution of the process is permitted, in response to a check request for checking whether or not the process is executable for the process request information transmitted from the information processing apparatus via a virtual private line established with the information processing apparatus, in a case where a set of the identification information on the information processing apparatus and the identification information on the process included in the check request is registered in the process management information storage unit, and the second processor is configured to, in response to the process request information, transmit a check request for checking whether or not the process is executable, the check request including the identification information on the information processing apparatus and the identification informa- (Continued)

tion on the process requested to be executed, to the server via a virtual private line established with the server, and execute the requested process in a case where the execution permission information is returned from the server in response to the transmitted check request.

20 Claims, 5 Drawing Sheets

(56) References Cited

U.S. PATENT DOCUMENTS

2013/0067087 A1  3/2013  Larson
2015/0324152 A1  11/2015 Ding
2022/0311905 A1* 9/2022  Nakamura .......... H04L 63/0272

FOREIGN PATENT DOCUMENTS

| JP | 2007013940 | 1/2007 |
| JP | 2008289040 | 11/2008 |
| JP | 4882030 | 2/2012 |
| JP | 2017156969 | 9/2017 |
| JP | 6214445 | 10/2017 |

OTHER PUBLICATIONS

"Notice of Reasons for Refusal of Japan Counterpart Application No. 2021-052099", issued on Dec. 10, 2024, with English translation thereof, p. 1-p. 6.

* cited by examiner

JOB MANAGEMENT INFORMATION

| DATE AND TIME INFORMATION | JOB ID | SOURCE (APPARATUS ID) | DESTINATION (APPARATUS ID) | PRINT INSTRUCTOR (USER ID) |
|---|---|---|---|---|
| MM/DD/YY HH:MM | job001 | PC01 | MFP01 | user A |
| . . . . | | | | |

INFORMATION PROCESSING SYSTEM, SERVER, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-052099 filed Mar. 25, 2021.

BACKGROUND

(i) Technical Field

The present invention relates to an information processing system, a server, an information processing apparatus, a non-transitory computer readable medium storing a program.

(ii) Related Art

In many cases, it is necessary to access the network system built in the company (hereinafter, "internal company system.") from the outside such as the destination for business trip. In this case, a technique is used in which a VPN server is connected to an internal company system and a PC taken out to the outside is connected to the VPN server by VPN. Thus, the PC can access the internal company system from the outside while maintaining security. Other examples of related art include JP6214445B, JP4882030B, JP2008-289040A, and JP2004-274448A.

Incidentally, in recent years, there are increasing opportunities to work outside the company such as teleworking. In this case, for example, it is desirable to allow users to use the multifunction device as much as in the company for business processing even outside the company. In this case, in consideration of security, for example, it is preferable to transmit data to the multifunction device and communicate data such as execution instructions via an internal company VPN server.

SUMMARY

Aspects of non-limiting embodiments of the present disclosure relate to cause an information processing apparatus connected to a local area network of an organization via a virtual private line to execute a process on the condition that communication is performed via the virtual private line.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a first processor mounted on a server connected to a local area network of an organization to which a user belongs, and a second processor mounted on an information processing apparatus provided outside the local area network, in which the first processor is configured to, in a case of relaying process request information addressed to the information processing apparatus, the process request information including data which is a target of a process, and process information including identification information on the process, information specifying a request source of the process, and identification information on the information processing apparatus which is a request destination of the process, associate the identification information on the process with the identification information on the information processing apparatus included in the process request information to generate processing management information, and register the generated processing management information in a process management information storage unit, and return execution permission information indicating that execution of the process is permitted, in response to a check request for checking whether or not the process is executable for the process request information transmitted from the information processing apparatus via a virtual private line established with the information processing apparatus, in a case where a set of the identification information on the information processing apparatus and the identification information on the process included in the check request is registered in the process management information storage unit, and the second processor is configured to, in response to the process request information, transmit a check request for checking whether or not the process is executable, the check request including the identification information on the information processing apparatus and the identification information on the process requested to be executed, to the server via a virtual private line established with the server, and execute the requested process in a case where the execution permission information is returned from the server in response to the transmitted check request.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the accompanying drawings.

Figure 1:
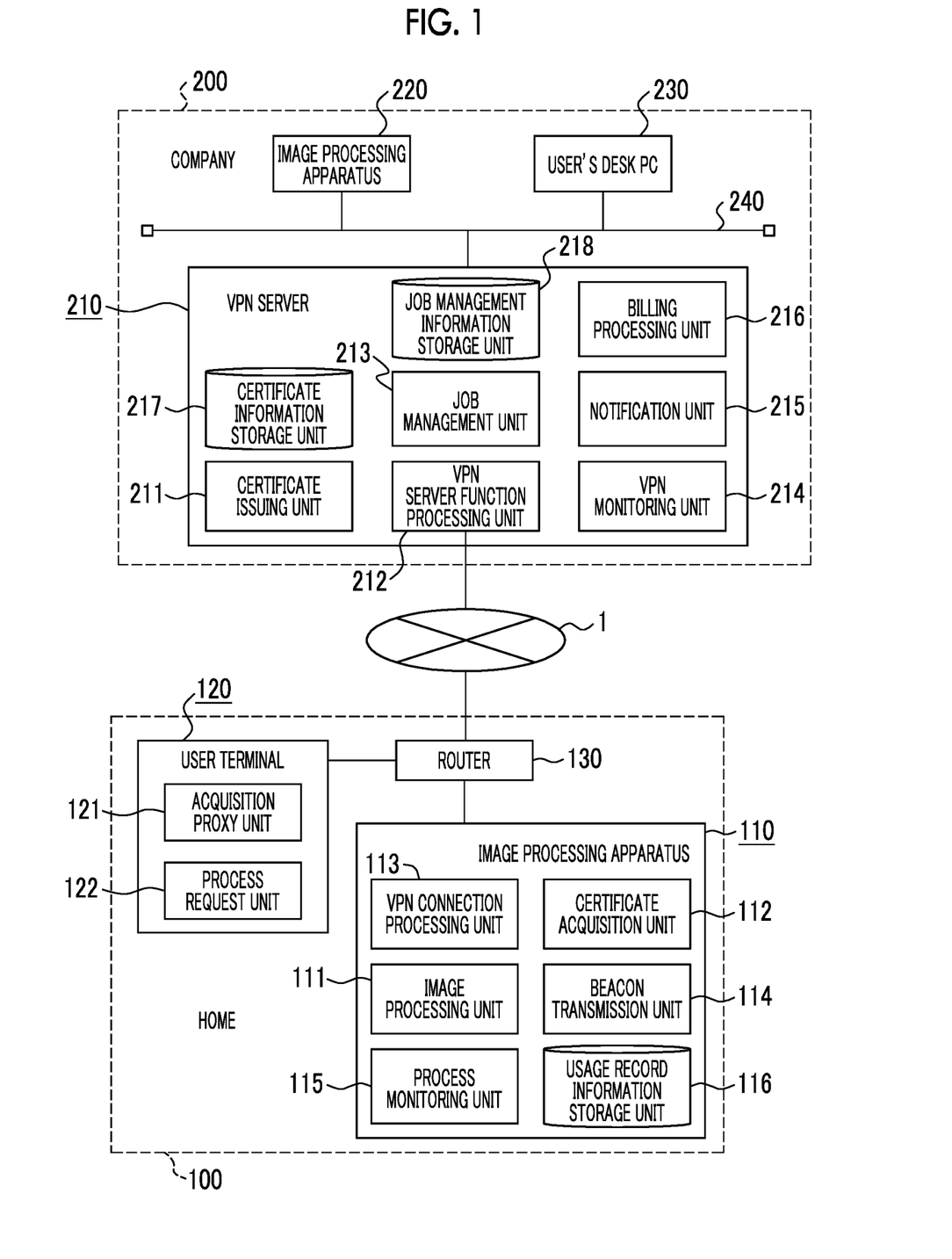
FIG. 1 is a block configuration diagram illustrating an exemplary embodiment of an information processing system according to the present invention.

FIG. 1 is a block diagram illustrating an exemplary embodiment of an information processing system according to the present invention. FIG. 1 illustrates a configuration in which a system installed in a home 100 and a system installed in a company 200 are connected by a network 1 including the Internet or the like. The information processing system in the present exemplary embodiment can be achieved as hardware by combining existing computers and the like, and as will be described later, the characteristic information processing control in the present exemplary embodiment is achieved by the software running on each computer.

The information processing system may include plural home systems and plural company systems, but each home system and each company system may have respective configurations to be described later, so that one home system and one company system are illustrated in FIG. 1.

The home 100 is the home 100 of an employee or the like (hereinafter, "user") of the company illustrated in FIG. 1. Since the home 100 is provided outside the internal company Local Area Network (LAN) system of the company 200, there is no guarantee that the environment is safe in terms of security.

The home 100 is provided with an image processing apparatus 110, a user terminal 120, and a router 130. The router 130 relays data communication between the image processing apparatus 110 and the user terminal 120 and other apparatuses such as a VPN server 210 having communication functions via the network 1. The user terminal 120 is a Personal Computer (PC) that the user personally uses. Of course, the user terminal 120 may be another terminal device as long as the VPN connection and the job execution process request described later can be made. In the present exemplary embodiment, it is assumed that the company 200 has lent the image processing apparatus 110 to the user in order to support teleworking in the home 100.

The image processing apparatus 110, also called an image forming apparatus, is a multifunction device equipped with various image processing functions such as a printing function, a copying function, and a scanner function, and functions as an information processing apparatus having a built-in computer. The image processing apparatus 110 includes a CPU as a second processor, a ROM, a RAM, a HDD, a scanner as an image reading device that reads an image on a medium such as paper, a print engine as an image forming device that forms an image on the medium, an operation panel that receives instructions from users and displays information, and a network interface for connecting communication lines such as the network 1. Further, an external media interface for connecting an external memory device such as a USB memory or a flash memory, and a wireless communication means for performing short-range wireless communication with the user terminal 120 may be provided.

The image processing apparatus 110 includes an image processing unit 111, a certificate acquisition unit 112, a VPN connection processing unit 113, a beacon transmission unit 114, a process monitoring unit 115, and a usage record information storage unit 116. The image processing unit 111 executes image processing in response to a request from the user. In the present exemplary embodiment, printing is performed by executing a print job as image processing. Therefore, in the following description, "image processing" and "print job" are used interchangeably.

In principle, the image processing apparatus 110 in the present exemplary embodiment executes image processing in response to a process request received via a VPN connected to the company 200. The certificate acquisition unit 112 executes a process for acquiring a certificate necessary for connecting the VPN server 210 of the company 200 and the VPN.

The VPN connection processing unit 113 is connected by VPN to the VPN server 210 of the company 200 to which the user belongs. In the present exemplary embodiment, the connection between the two parties, for example, the image processing apparatus 110 and the VPN server 210 so as to be communicable by VPN is referred to as "VPN connection".

Further, the VPN connection processing unit 113 disconnects the connected VPN in response to a release request.

The beacon transmission unit 114 periodically transmits a heartbeat signal (hereinafter, "beacon") indicating that the VPN is connected, to the VPN server 210 via the VPN. In the present exemplary embodiment, as described above, in principle, the image processing unit 111 is caused to execute the image processing in response to the process request received via the VPN connected to the company 200, but depending on the situation, exceptionally, the image processing unit 111 may be caused to execute the image processing in response to the process request which is not received via the VPN. In a case where the process is executed in response to the process execution instruction, the process monitoring unit 115 records discrimination information indicating whether the process to be executed is based on a request via VPN or a request not via VPN, in the usage record information storage unit 116.

Each component 111 to 115 of the image processing apparatus 110 is achieved by a cooperative operation of a computer mounted on the image processing apparatus 110 and a program running on a CPU as a second processor mounted on the computer. Further, the usage record information storage unit 116 is achieved by the HDD mounted on the image processing apparatus 110. Alternatively, the RAM or another information processing apparatus in the home 100 may be used via the home LAN.

The user terminal 120 is used by the user as described above. The user terminal 120 may bring back the PC used in the company 200, for example, a user's desk PC 230, to the home 100 and use the PC. The user terminal 120 has an acquisition proxy unit 121 and a process request unit 122. The acquisition proxy unit 121 acquires the certificate by proxy for the image processing apparatus 110 in the home 100. The process request unit 122 requests the image processing in the image processing apparatus 110 by instructing the execution of the image processing.

Each component 121 and 122 of the user terminal 120 is achieved by a cooperative operation of a computer mounted on the user terminal 120 and a program running on a CPU mounted on the computer.

The company 200 is formed with a company LAN system constructed by connecting the VPN server 210, the image processing apparatus 220, and the user's desk PC 230 via the LAN 240. Other apparatuses may be connected to the LAN 240, but the apparatuses are omitted from the drawings because the apparatuses are not used in the description of the present exemplary embodiment.

The VPN server 210 has a function for connecting a VPN in response to a VPN connection request from an external apparatus, called a VPN server function or a VPN router function. The VPN server 210 includes a certificate issuing unit 211, a VPN server function processing unit 212, a job management unit 213, a VPN monitoring unit 214, a notification unit 215, a billing processing unit 216, a certificate information storage unit 217, and a job management information storage unit 218. Components not used in the description of the present exemplary embodiment are omitted from the drawings.

In a case of receiving certificate issuance request information, the certificate issuing unit 211 issues the certificate in a case where the predetermined conditions are satisfied, in response to the issuance request information. The VPN server function processing unit 212 has a VPN server function, and makes a VPN connection in response to a request from the image processing apparatus 110 outside. In a case where the job management unit 213 receives the process request information corresponding to the image processing execution instruction and relays the process request information to the image processing apparatus 110 that is the image processing request destination, the job management unit 213 associates at least the identification information on the print job (hereinafter, "job ID") with the identification information on the image processing apparatus 110 that is the image processing request destination (hereinafter, "apparatus ID") included in the process request information to generate job management information as process management information, and registers the generated job management information in the job management information storage unit 218.

The VPN monitoring unit 214 constantly monitors the connection state of the VPN with the image processing apparatus 110. A specific example is illustrated below, and the notification unit 215 notifies the user in the home 100 or the administrator of the company 200 that it is necessary to provide a warning notification. In a case where the process executed by the image processing apparatus 110 is based on a process request without passing through the VPN, the billing processing unit 216 charges for the execution of the process. The information stored in each of the storage units 217 and 218 will be described together with the description of the operation.

Each component 211 to 216 of the VPN server 210 is achieved by a cooperative operation of a computer forming the VPN server 210 and a program running on a CPU as a first processor mounted on the computer. Further, each storage unit 217 and 218 is achieved by the HDD mounted on the VPN server 210.

Alternatively, a RAM or another information processing apparatus connected to the LAN 240 may be used.

Like the image processing apparatus 110, the image processing apparatus 220 is a multifunction device equipped with various image processing functions such as a printing function, a copying function, and a scanner function. The user's desk PC 230 is an information processing apparatus used in the company by the user in the home 100.

Further, the program used in the present exemplary embodiment can be provided not only by communication means but also by being stored in a computer-readable recording medium such as a CD-ROM or a USB memory. The programs provided by the communication means and the recording medium are installed in the computer, and various processes are achieved by the CPU of the computer sequentially executing the programs.

Next, the operation in the present exemplary embodiment will be described.

As described above, in the present exemplary embodiment, the image processing apparatus 110 is lent to the user in consideration of convenience in a case where the user performs business in the home 100. Therefore, the image processing apparatus 110 is usually used for business purposes, and the company 200 wants to prevent private use by the user. Therefore, in the present exemplary embodiment, regarding the execution of the image processing of the print job, the image processing apparatus 110 is caused to execute only the print job related to the image processing sent to the image processing apparatus 110 via the VPN established between the VPN server 210 and the image processing apparatus 110. Therefore, the VPN server 210 manages the execution of the image processing in the image processing apparatus 110.

In order for the VPN server 210 to manage the execution of image processing by the image processing apparatus 110, first, it is necessary to create an environment in which a VPN is established between the image processing apparatus 110 and the VPN server 210, and the image processing by the image processing apparatus 110 can be managed. Hereinafter, the process for enabling management of image processing in the image processing apparatus 110 will be described with reference to the sequence diagram shown in FIG. 2.

Figure 2:
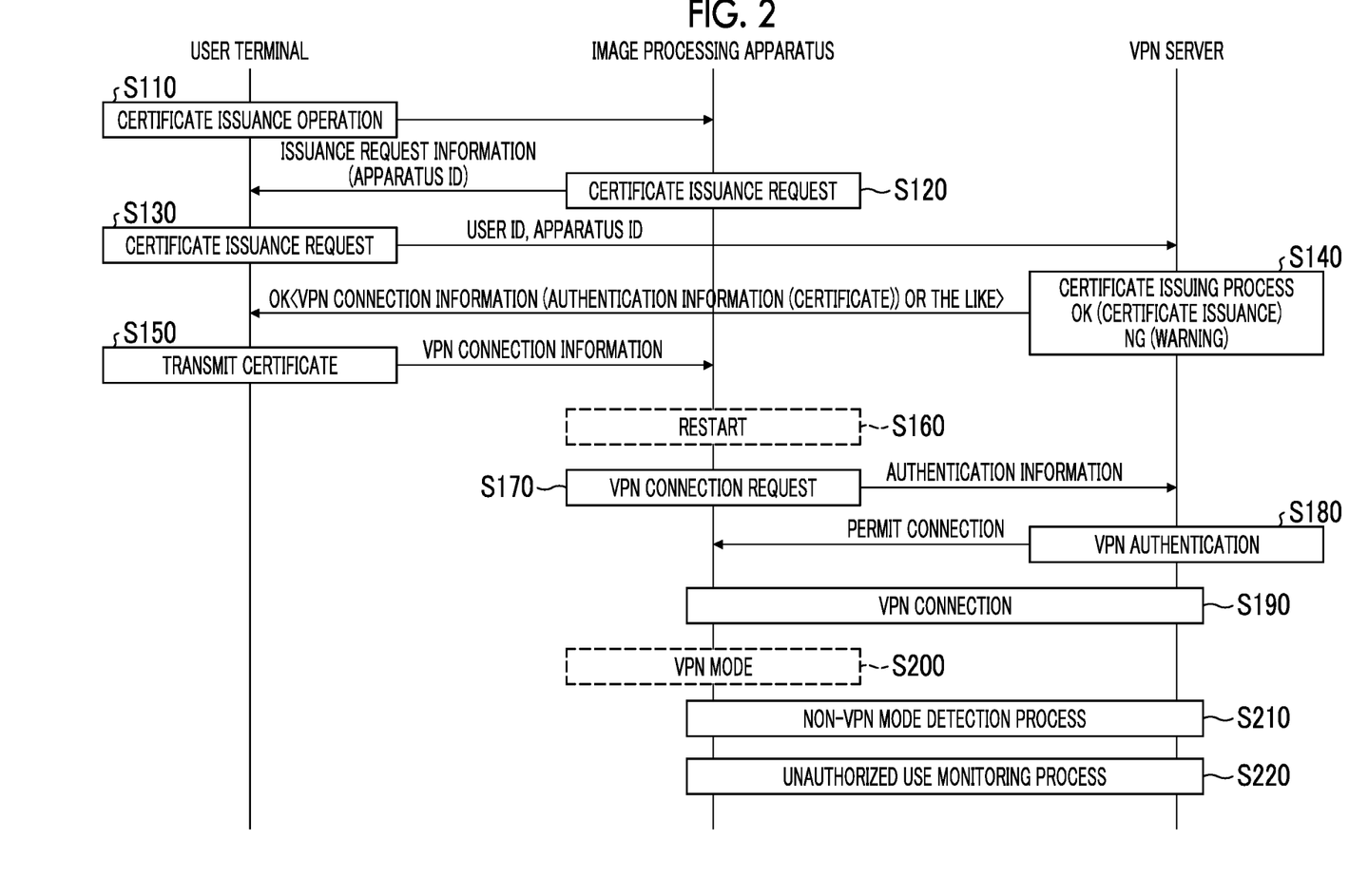
FIG. 2 is a sequence diagram illustrating a process for enabling management of image processing in an image processing apparatus, in the present exemplary embodiment.

First, the user needs to bring the image processing apparatus 110 lent by the company 200 to the home 100 and build an environment for use. The user may not bring the image processing apparatus 110 in by himself but mail the image processing apparatus 110. Therefore, the user needs to make a VPN connection with the VPN server 210 in the company 200. As a preparation, it is necessary to make the VPN server 210 issue a certificate necessary for VPN connection. In order to have the certificate issued, the user first performs an operation for issuing the certificate from the user terminal 120, and accesses the image processing apparatus 110 (Step S110). The image processing apparatus 110 transmits the certificate issuance request information to the user terminal 120 in response to this operation (Step S120). The certificate issuance request information includes an apparatus ID that identifies the image processing apparatus 110, for example, a UUID or an IP address, as data necessary for acquiring the certificate.

In a case where the acquisition proxy unit 121 in the user terminal 120 acquires the apparatus ID from the image processing apparatus 110, the acquisition proxy unit 121 transmits a certificate issuance request including user's identification information (hereinafter, "user ID") and the apparatus ID of the image processing apparatus 110 to the VPN server 210 (Step S130).

The user terminal 120 transmits a certificate issuance request via the VPN established with the VPN server 210, by using the information necessary for VPN connection with the VPN server 210, held inside. Since the image processing apparatus 110 is not connected by VPN to the VPN server 210 at this time, the user terminal 120 acquires the certificate by proxy for the image processing apparatus 110.

In the VPN server 210, the certificate issuing unit 211 executes a certificate issuance process for determining whether or not to issue a certificate, in response to receiving the certificate issuance request (Step S140). Hereinafter, the certificate issuance process will be described with reference to the flowchart illustrated in FIG. 3.

Figure 3:
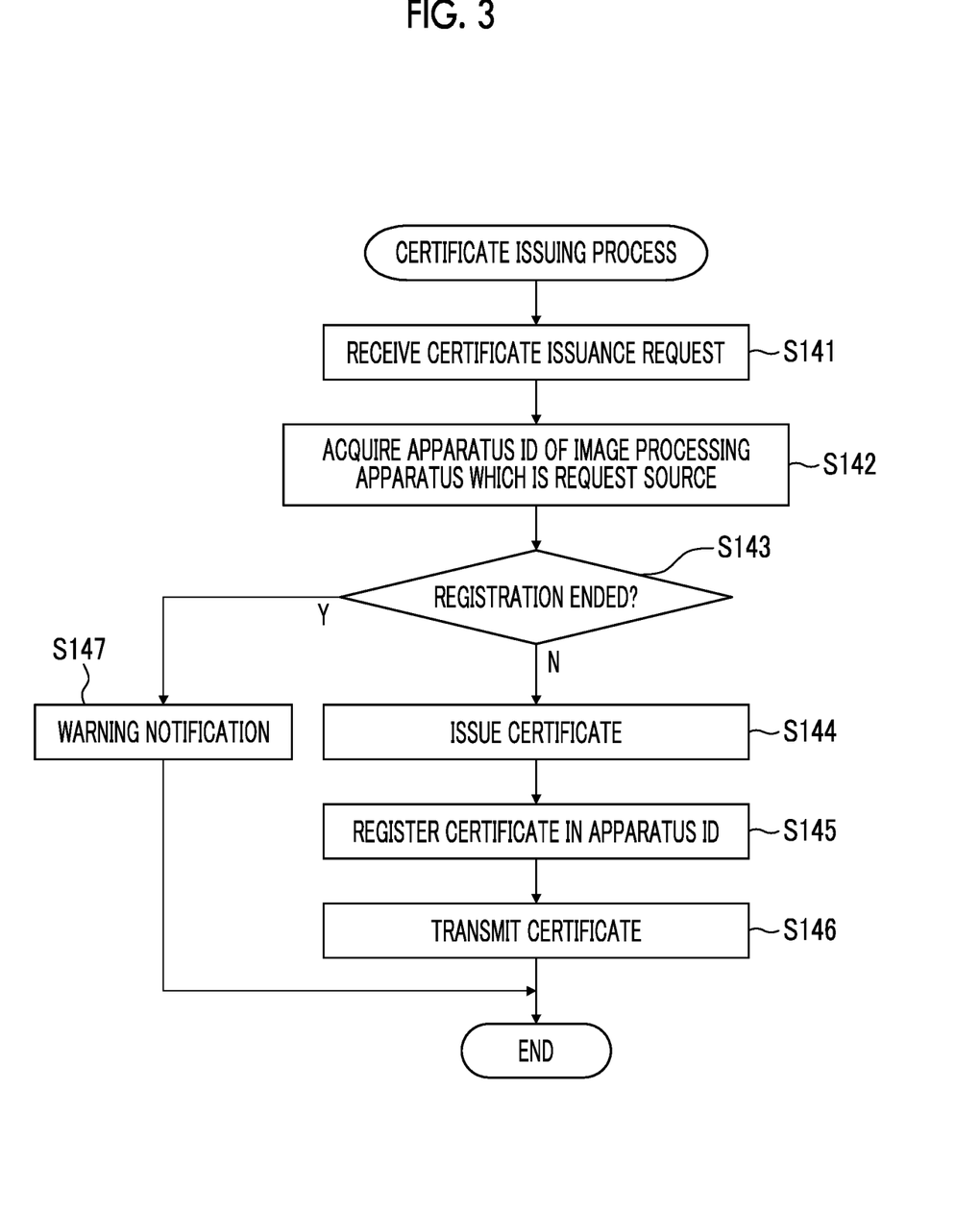
FIG. 3 is a flowchart illustrating a certificate issuance process according to the present exemplary embodiment.

In a case of receiving the certificate issuance request as described above (Step S141), the certificate issuing unit 211 extracts and acquires the apparatus ID of the image processing apparatus 110 which is the issuance request source from the certificate issuance request. Then, the certificate issuing unit 211 checks whether or not the image processing apparatus 110 of the issuance request source meets the predetermined conditions. Specifically, it is checked whether or not the apparatus ID of the image processing apparatus 110 is registered in the certificate information storage unit 217. In a case where it is not registered (N in Step S143), the certificate issuing unit 211 issues a certificate to the image processing apparatus 110 corresponding to the apparatus ID (Step S144).

Subsequently, the certificate issuing unit 211 registers, in the certificate information storage unit 217, the issued certificate in association with the apparatus ID of the image processing apparatus 110 which is the issuance destination (Step S145). After that, the certificate issuing unit 211 transmits the issued certificate to the user terminal 120 which is the certificate issuance request source (Step S146).

Here, the data structure of the certificate information stored in the certificate information storage unit 217 will be described. As described above, the certificate information is configured by associating the issued certificate with the apparatus ID of the image processing apparatus 110 that has issued the certificate. Further, the certificate information may be associated with the user ID of the user who has borrowed the image processing apparatus 110. Only the information related to the image processing apparatus 110 lent is registered in the certificate information storage unit 217. Therefore, in a case where the image processing apparatus 110 is returned, for example, it is suitable to manage the information related to the image processing apparatus 110 by deleting the information or adding flag information indicating the return or date and time information.

On the other hand, in a case where the apparatus ID included in the certificate issuance request is registered in the certificate information storage unit 217 (Y in Step S143), the certificate issuing unit 211 provides a warning notification to the user terminal 120 which is the certificate issuance request source (Step S147).

The fact that the apparatus ID included in the certificate issuance request is registered in the certificate information storage unit 217 means that the certificate has already been issued to the image processing apparatus 110 corresponding to the apparatus ID, and at this time, the certificate issuance request corresponds to the second and subsequent issuance requests. In the present exemplary embodiment, the certificate is strictly managed and will not be reissued. That is, the certificate issuing unit 211 issues a certificate only in a case where the apparatus ID of the image processing apparatus 110 included in the issuance request information is not registered in the certificate information storage unit 217.

The warning includes a message not to reissue the certificate because the certificate issuance request corresponds to the second and subsequent issuance requests. Originally, the certificate needs to be issued only once to the image processing apparatus 110. Therefore, there is a possibility of unauthorized use of the image processing apparatus 110, in a case where there are certificate issuance requests multiple times. In a case where the certificate is lost based on a legitimate reason, the user may return the image processing apparatus 110 once and re-lease the image processing apparatus 110 again according to a formal procedure.

Here, assuming that the first issuance request, the explanation will be continued by returning to FIG. 2. However, as described in Step S146 above, the certificate issuing unit 211 transmits the issued certificate to the user terminal 120 which is the certificate issuance request source. More specifically, VPN connection information required for VPN connection is transmitted. The VPN connection information includes a server address, a port number, and authentication information. The server address is address information for specifying the VPN server 210 that is an access destination, and basically an IP address is set. The port number is a port number for connecting to the VPN server 210. The authentication information is information necessary for the image processing apparatus 110 to be authenticated by the VPN server 210 which is the connection destination, and includes an access ID, a password, a certificate issued in response to an issuance request, and VPN settings including setting contents related to communication via a VPN such as an encryption method or a protocol.

In a case where the VPN server connection information is acquired from the VPN server 210, the acquisition proxy unit 121 in the user terminal 120 transmits the VPN connection information including the certificate to the image processing apparatus 110 (Step S150).

The image processing apparatus 110 acquires the certificate required for the VPN connection from the VPN server 210 via the user terminal 120 as described above.

In a case where the VPN server connection information is acquired, the image processing apparatus 110 in the present exemplary embodiment is restarted (Step S160). In a case where the image processing apparatus 110 is restarted, the VPN connection processing unit 113 transmits a VPN connection request including authentication information to the server address and port number included in the VPN server connection information (Step S170).

In a case of receiving the VPN connection request from the image processing apparatus 110, the VPN server function processing unit 212 in the VPN server 210 authenticates the image processing apparatus 110 based on the authentication information included in the request, and then returns the connection permission (Step S180).

In a case where the VPN connection is permitted from the VPN server 210 as described above, the VPN connection processing unit 113 is connected by VPN to the VPN server 210 (Step S190).

In the present exemplary embodiment, in a case where VPN connection is made as described above, the image processing apparatus 110 shifts to the VPN mode (Step S200). The "VPN mode" is a mode in which the image processing apparatus 110 maintains a VPN connection with the VPN server 210 and operates in a state of receiving only data via the VPN. The non-VPN mode detection process (Step S210) and the unauthorized use monitoring process (Step S220) will be described later.

As described above, in the present exemplary embodiment, in a case where the image processing apparatus 110 is restarted after acquiring the certificate, the image processing apparatus 110 always operates in the VPN mode. Of course, it is not always necessary to restart the image processing apparatus 110, in a case where the user makes a VPN connection by himself after acquiring the certificate according to the operation rules with the company and operates to shift to the VPN mode. Alternatively, in a case where the user does not directly instruct the image processing apparatus 110 to perform processing, the image processing apparatus 110 is not constantly connected to the VPN, and may be connected to the VPN in response to the request from the user. However, in the present exemplary embodiment, by shifting to the VPN mode immediately after startup, the image processing apparatus 110 is in a state where the image processing apparatus 110 cannot directly receive the image processing instruction from the user terminal 120, so that private use of the image processing apparatus 110 can be prevented more reliably.

In the present exemplary embodiment, the image processing apparatus 110 is brought back to the home 100 and then the certificate is acquired. However, the certificate may be acquired while in the company 200. In this case, the user connects the image processing apparatus 110 to the LAN 240 to transmit the issuance request information. The certificate issuing unit 211 checks that the certificate has not been issued to the image processing apparatus 110 as described above in response to the issuance request information sent from the image processing apparatus 110, and then issues the certificate. Then, the image processing apparatus 110 acquires the VPN connection information including the issued certificate. Then, after the user brings the image processing apparatus 110 back to the home 100, the user promptly starts the image processing apparatus 110 to operate the image processing apparatus 110 in the VPN mode. In this way, the user can set the mode of the image processing apparatus 110 so as not to receive the information that does not go through the VPN, as in the case where the user terminal 120 acquires the certificate by proxy in the home 100.

Figure 4:
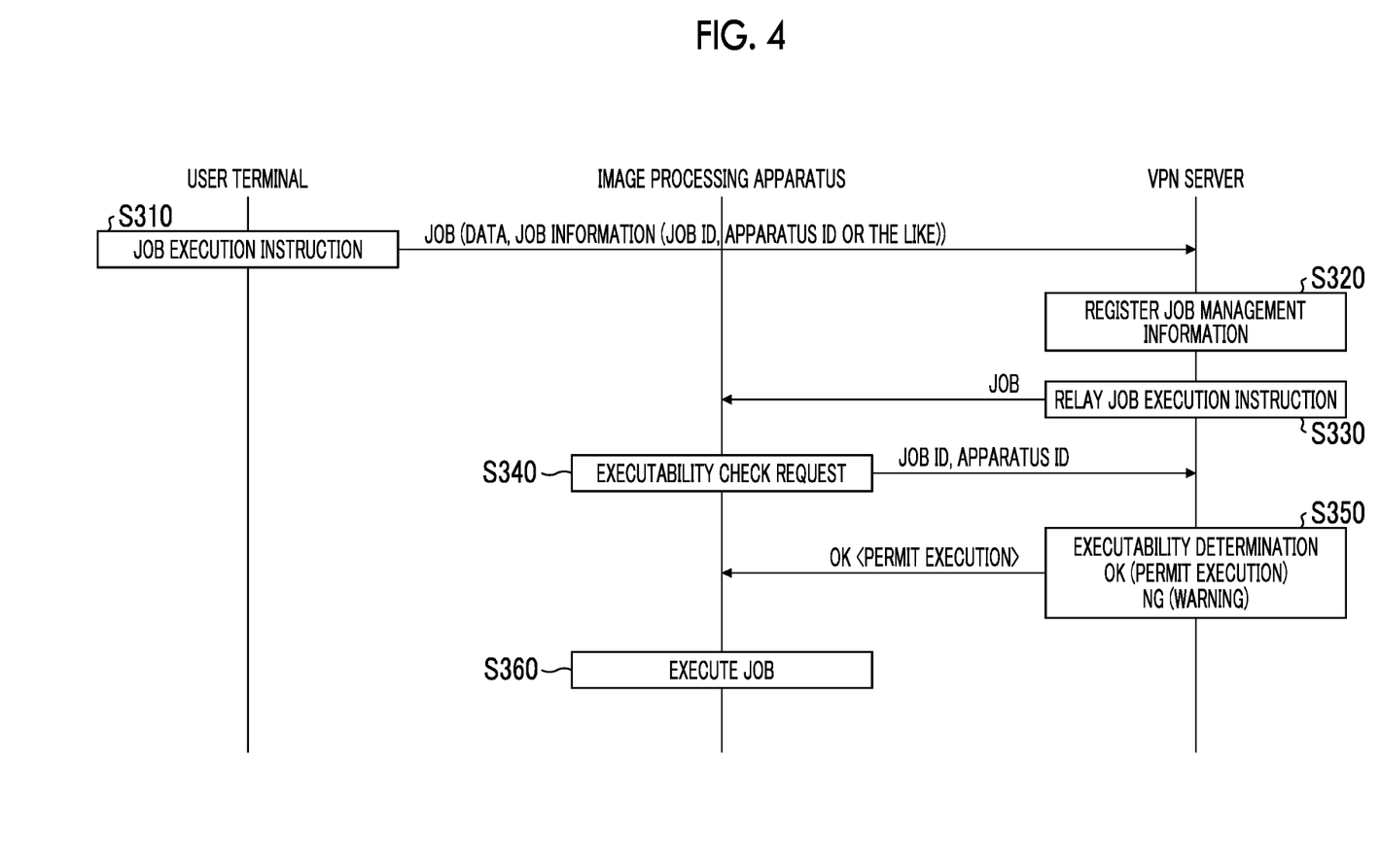
FIG. 4 is a sequence diagram illustrating a process performed when a user executes printing in the present exemplary embodiment.

Subsequently, the process executed when the user performs printing will be described with reference to the sequence diagram shown in FIG. 4.

The user instructs the image processing apparatus 110 to print from the user terminal 120. More specifically, the process request unit 122 generates a job for the image processing apparatus 110 to execute, in response to the print instruction in which the data to be printed is specified from the user, and transmits an instruction that instructs the image processing apparatus 110 to execute the job, in other words, the print process request, to the VPN server 210 via the VPN established with the VPN server 210 (Step S310). The job includes data to be printed and job information as before. The job information includes a job ID of the job, date and time information indicating the job generation date and time, a user ID of the user who has issued the print instruction, information for specifying the source of the job, and information for specifying the destination of the job, in other words, information identifying the image processing apparatus 110 to execute the job. In the present exemplary embodiment, the identification information on the user terminal 120 (hereinafter, "terminal ID") is set as the information for specifying the source of the job. Further, the apparatus ID of the image processing apparatus 110 is set as the information for specifying the image processing apparatus 110.

In a case where the VPN server 210 receives the print process request from the user terminal 120, the job management unit 213 generates job management information by associating at least the job ID of the job included in the print process request with the apparatus ID of the image processing apparatus 110 which is the execution instruction destination of the job, and registers the job management information in the job management information storage unit 218 (Step S320). Then, the job management unit 213 transmits the job via the VPN established with the image processing apparatus 110 that is the execution destination of the job (Step S330). That is, the VPN server 210 relays the job to be sent from the user terminal 120 to the image processing apparatus 110, and at that time, the VPN server 210 refers to the relayed job and generates job management information.

Figure 5:
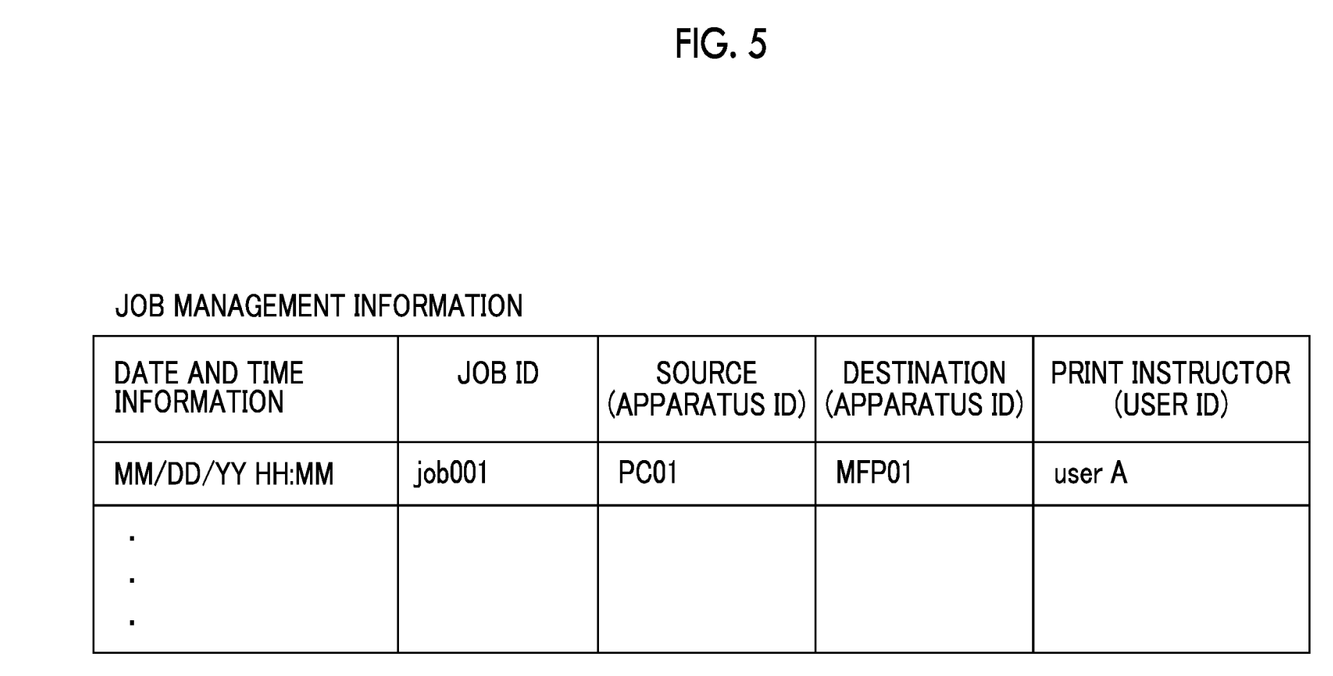
FIG. 5 is a diagram illustrating a data configuration example of job management information stored in a job management information storage unit according to the present exemplary embodiment.

FIG. 5 is a diagram illustrating a data configuration example of job management information stored in the job management information storage unit 218 in the present exemplary embodiment. The job management information includes date and time information extracted from the received job, a job ID, information for specifying a source, information for specifying a destination (that is, a job execution destination), and a print instructor.

In a case where the image processing unit 111 in the image processing apparatus 110 receives the job execution request, the image processing unit 111 transmits a request for checking whether or not the received job can be executed (hereinafter, simply "check request") to the VPN server 210 via the VPN (Step S340). Although the details will be described later, the image processing apparatus 110 may receive the job execution instruction without passing through the VPN, but no matter which route the execution instruction is received from, the image processing apparatus 110 transmits a check request to the VPN server 210 via the VPN. The check request transmitted to the VPN server 210 includes a job ID extracted from the received job and the apparatus ID.

In a case of receiving the check request, the job management unit 213 determines whether or not the requested job can be executed, in response to the check request, and executes the following processes according to the determination result (Step S350). That is, in a case where the set of the job ID and the apparatus ID included in the received check request is registered in the job management information storage unit 218, the job management unit 213 determines that the job execution request received by the image processing apparatus 110 is an execution request based on the job relayed by the VPN server 210, and permits the execution of the job. In a case where the execution is permitted, the job management unit 213 returns the execution permission information indicating that the job is permitted to be executed, in response to the check request. The job management information that matches the set of the job ID and the apparatus ID included in the check request is deleted from the job management information storage unit 218.

Here, assuming that the image processing apparatus 110 receives the job execution request via the VPN server 210, in a case where the execution of the job is permitted from the VPN server 210, the image processing unit 111 executes the job (Step S360). That is, printing is executed according to the job received from the user terminal 120 via the VPN server 210.

On the other hand, in Step S350, in a case where the set of the job ID and the apparatus ID included in the check request is not registered in the job management information storage unit 218, it is determined that the job execution request received by the image processing apparatus 110 is an execution request based on the job that is not relayed by the VPN server 210, and a warning notification is provided. That is, it is presumed that the user may be trying to use the image processing apparatus 110 privately, and the warning includes a message that the execution is not permitted. In a case of receiving this warning, the image processing unit 111 does not execute the job.

Further, in a case where the set of the job ID and the apparatus ID included in the check request is not registered in the job management information storage unit 218, the job management unit 213 may instruct the notification unit 215 to notify the administrator of the company 200 managing the image processing apparatus 110 and the VPN server 210 that the image processing apparatus 110 has received the execution request of the job that has not been relayed by the VPN server 210. In response to this notification, the administrator takes measures such as inquiring the user on the assumption that the user may be using the image processing apparatus 110 illegally.

As described above, according to the present exemplary embodiment, since the image processing apparatus 110 is made to execute only the job via the VPN server 210, it is possible to prevent the process of directly instructing the image processing apparatus 110 from the user terminal 120 from being executed. That is, it is possible to prevent the user from using the image processing apparatus 110 for private use.

Incidentally, the image processing apparatus 110 includes a virtual communication interface such as a VPN as communication means with other apparatuses, and a physical communication interface. In a case where another apparatus accesses the image processing apparatus 110 via a physical communication interface while the other apparatus is operating in the VPN mode, the image processing apparatus 110 constantly displays, for example, a predetermined management user interface screen, so that the private use of the image processing apparatus 110 may be prevented in advance. That is, in a case where another apparatus accesses the image processing apparatus 110, the management user interface screen is displayed on the other apparatus, and only the management user interface screen can be accessed. On the management user interface screen, a warning message indicating inaccessibility may be displayed, or a message prompting a predetermined operation may be displayed.

Here, the non-VPN mode detection process (Step S210) illustrated in FIG. 2 will be described.

As described above, the image processing apparatus 110 according to the present exemplary embodiment shifts to the VPN mode after the startup, and is in a state where the VPN connection is constantly maintained. However, the state of not being connected to the VPN may continue, in a case where the user does not switch the image processing apparatus 110 to the VPN mode after startup, or disconnects the VPN after VPN connection. It is also conceivable that the user uses the image processing apparatus 110 privately, when the image processing apparatus 110 is not operated in the VPN mode. Therefore, in the present exemplary embodiment, a mode other than the VPN mode, that is, a non-VPN mode is detected as follows.

First, in a case where the image processing apparatus 110 is started, the beacon transmission unit 114 periodically sends a heartbeat packet (hereinafter, "beacon") as a signal indicating that the VPN is connected, to the VPN server 210 via the VPN.

The VPN monitoring unit 214 in the VPN server 210 is constantly waiting for a beacon to be transmitted from the image processing apparatus 110 via the VPN. Further, the VPN monitoring unit 214 holds a counter inside, and counts up the counter at regular intervals. In a case of receiving the beacon, the VPN monitoring unit 214 resets the counter held inside. That is, the counter is initialized to 0. In a case where the VPN is connected, the VPN monitoring unit 214 can receive the beacon periodically, so that the counter can be reset periodically. On the other hand, when the VPN is not connected, the counter cannot be reset, so that the counter is counted up at regular intervals. Then, in a case where the counter is not reset for a predetermined period, the counter reaches a predetermined upper limit value. Since the VPN monitoring unit 214 constantly monitors the counter, the VPN monitoring unit 214 detects that the image processing apparatus 110 has not been connected to the VPN for a predetermined period, in other words, the image processing apparatus 110 is not in the VPN mode. In this case, the notification unit 215 notifies the administrator that the image processing apparatus 110 is not operating in the VPN mode, in response to the instruction from the VPN monitoring unit 214. In a case where the image processing apparatus 110 has not been used for a predetermined period, for example, several days although the image processing apparatus 110 is lent to the user for use, the image processing apparatus 110 may be used privately during that period. Therefore, in response to the notification from the notification unit 215, the administrator takes measures such as inquiring the user on the assumption that the user may be using the image processing apparatus 110 illegally.

Subsequently, the unauthorized use monitoring process (Step S220) illustrated in FIG. 2 will be described.

As described above, the image processing apparatus 110 is lent to the user in order to perform business. Therefore, the private use of the image processing apparatus 110 by the user is prevented. However, in a case where certain conditions are satisfied, it is considered that private use may be permitted. Therefore, unlike the above operation, the image processing apparatus 110 may be operated such that the image processing apparatus 110 is permitted to execute the process without passing through the VPN.

In a case where the image processing unit 111 executes a job in response to a job execution request, the process monitoring unit 115 records discrimination information indicating whether the execution of the job is based on a request via VPN with the VPN server 210 or a request not via VPN, in the usage record information storage unit 116. The usage record information storage unit 116 stores the execution log of the job executed by the image processing apparatus 110 as usage record information, but the process monitoring unit 115 may record flag information indicating whether a request is made via VPN or not as discrimination information in association with the job ID or the like included in the usage record information. Alternatively, a counter may be provided in the usage record information storage unit 116 as discrimination information for each of the requests via VPN and the request not via VPN, and one of the counters may be counted up each time the job is executed.

The job management unit 213 in the VPN server 210 acquires the usage record information from the image processing apparatus 110 at a predetermined timing. Then, in a case where it is detected that the user is executing the job based on the execution request without passing through the VPN by referring to the discrimination information, the job management unit 213 may instruct the notification unit 215 to notify the administrator that the job has been executed by the image processing apparatus 110 in response to the execution request of the job not relayed by the VPN server 210.

In addition, the billing processing unit 216 charges the user for the execution by the user of the job based on the execution request without passing through the VPN. The method of calculating the billing amount and the method of billing may be the same as the existing methods, and are not a feature of the present exemplary embodiment, and are not particularly described.

According to the present exemplary embodiment, the private use of the image processing apparatus 110 by the user may be allowed as described above.

In the above exemplary embodiment, a case has been described where a job execution request is sent from the user terminal 120 in the home 100 to the image processing apparatus 110 via the VPN server 210. However, in a case where a job execution request is sent from the image processing apparatus 220 or the user's desk PC 230 installed in the company 200 to the image processing apparatus 110, the VPN server 210 can create job management information and hold and manage the job management information, so that the image processing apparatus 110 executes a print job.

In the above description, the printing process has been described as an example of the process to be executed by the image processing apparatus 110, but the present invention is not limited to this, and any processing function possessed by the image processing apparatus 110 may be used.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
    a first processor mounted on a server connected to a local area network of an organization to which a user belongs; and
    a second processor mounted on an information processing apparatus provided outside the local area network,
    wherein the first processor is configured to:
        in a case of relaying process request information addressed to the information processing apparatus, the process request information including data which is a target of a process, and process information including identification information on the process, information specifying a request source of the process, and identification information on the information processing apparatus which is a request destination of the process, associate the identification information on the process with the identification information on the information processing apparatus included in the process request information to generate processing management information, and register the generated processing management information in a process management information storage unit; and
        return execution permission information indicating that execution of the process is permitted, in response to a check request for checking whether or not the process is executable for the process request information transmitted from the information processing apparatus via a virtual private line established with the information processing apparatus, in a case where a set of the identification information on the information processing apparatus and the identification information on the process included in the check request is registered in the process management information storage unit, and
    the second processor is configured to:
        in response to the process request information, transmit a check request for checking whether or not the process is executable, the check request including the identification information on the information processing apparatus and the identification information on the process requested to be executed, to the server via a virtual private line established with the server; and
        execute the requested process in a case where the execution permission information is returned from the server in response to the transmitted check request.

2. The information processing system according to claim 1, wherein the first processor is configured not to
    execute the process, in a case where the set of the identification information on the information processing apparatus and the identification information on the process included in the check request transmitted from the information processing apparatus is not registered in the process management information storage unit.

3. The information processing system according to claim 2, wherein the first processor is configured to
    notify an administrator of the organization that the check request including the set of the identification information on the information processing apparatus and the identification information on the process, which is not registered in the process management information storage unit, has been received.

4. The information processing system according to claim 3,
    wherein the information processing apparatus is an image forming apparatus lent to a user belonging to the organization.

5. The information processing system according to claim 2,
    wherein the information processing apparatus is an image forming apparatus lent to a user belonging to the organization.

6. The information processing system according to claim 1, wherein the second processor is configured to:
    transmit issuance request information on a certificate to be used in a case where the virtual private line is connected to the server, the issuance request information including identification information on the information processing apparatus,
    connect the virtual private line by using the certificate in a case where the information processing apparatus is started, after acquiring the certificate from the server in response to the issuance request information; and
    receive no information from other than the virtual private line, while the virtual private line is connected.

7. The information processing system according to claim 6, wherein the first processor is configured to:
    in a case of issuing the certificate in response to the issuance request information, register, in an issuance destination information storage unit, the certificate issued for the information processing apparatus in association with the identification information on the information processing apparatus included in the issuance request information, and
    issue the certificate only in a case where the identification information on the information processing apparatus included in the issuance request information is not registered in the issuance destination information storage unit.

8. The information processing system according to claim 7,
    wherein the information processing apparatus is an image forming apparatus lent to a user belonging to the organization.

9. The information processing system according to claim 6, wherein the second processor is configured to
    periodically transmit a signal indicating that the virtual private line is connected, to the server, via the virtual private line, after the virtual private line is connected, and
    the first processor is configured to wait for the signal to be transmitted from the information processing apparatus, after the certificate is issued.

10. The information processing system according to claim 9, wherein the first processor is configured to
provide a notification to an administrator of the organization, in a case where the signal is not transmitted from the information processing apparatus for a predetermined period of time.

11. The information processing system according to claim 10,
wherein the information processing apparatus is an image forming apparatus lent to a user belonging to the organization.

12. The information processing system according to claim 9,
wherein the information processing apparatus is an image forming apparatus lent to a user belonging to the organization.

13. The information processing system according to claim 6,
wherein the information processing apparatus is an image forming apparatus lent to a user belonging to the organization.

14. The information processing system according to claim 1, wherein the second processor is configured to,
in a case of executing the process in response to the process request, record discrimination information indicating whether the process to be executed is based on a request via the virtual private line or a request without passing through the virtual private line, in the information processing apparatus.

15. The information processing system according to claim 14, wherein the first processor is configured to:
acquire the discrimination information from the information processing apparatus via the virtual private line, and
in a case where the process is executed in response to the process request without passing through the virtual private line, notify an administrator of the organization that the process is based on the process request without passing through the virtual private line.

16. The information processing system according to claim 15, wherein the first processor is configured to
charge for the execution of the process, in a case where the process executed by the information processing apparatus is based on the process request without passing through the virtual private line.

17. The information processing system according to claim 1,
wherein the information processing apparatus is an image forming apparatus lent to a user belonging to the organization.

18. A server that is connected to a local area network of an organization to which a user belongs, and is connected to an information processing apparatus provided outside the local area network via a virtual private line, the server comprising:
a processor configured to:
in a case of relaying process request information addressed to the information processing apparatus, the process request information including data which is a target of a process, and process information including identification information on the process, information specifying a request source of the process, and identification information on the information processing apparatus which is a request destination of the process, associate the identification information on the process with the identification information on the information processing apparatus included in the process request information to generate processing management information, and register the generated processing management information in a process management information storage unit; and
in response to a check request for checking whether or not the process is executable for the process request information transmitted from the information processing apparatus via a virtual private line established with the information processing apparatus, in a case where a set of the identification information on the information processing apparatus and the identification information on the process included in the check request is registered in the process management information storage unit, return execution permission information indicating that execution of the process is permitted.

19. An information processing apparatus that is connected to a server, and is provided outside a local area network of an organization to which a user belongs, the information processing apparatus comprising:
a processor configured to:
in response to a process request information, transmit a check request for checking whether or not the process is executable, the check request including the identification information on the information processing apparatus and the identification information on the process requested to be executed, to the server via a virtual private line established with the server; and
execute the requested process in a case where execution permission information is returned from the server in response to the transmitted check request.

20. A non-transitory computer readable medium storing a program causing a computer forming a server connected to a local area network of an organization to which a user belongs, in an information processing system having the server and an information processing apparatus provided outside the local area network, to execute:
a function of, in a case of relaying process request information addressed to the information processing apparatus, the process request information including data which is a target of a process, and process information including identification information on the process, information specifying a request source of the process, and identification information on the information processing apparatus which is a request destination of the process, associating the identification information on the process with the identification information on the information processing apparatus included in the process request information to generate processing management information, and registering the generated processing management information in a process management information storage unit; and
a function of returning execution permission information indicating that execution of the process is permitted, in response to a check request for checking whether or not the process is executable for the process request information transmitted from the information processing apparatus via a virtual private line established with the information processing apparatus, in a case where a set of the identification information on the information processing apparatus and the identification information on the process included in the check request is registered in the process management information storage unit, and the program causing a computer forming the information processing apparatus to execute:
- a function of, in response to the process request information, transmitting a check request for checking whether or not the process is executable, the check request including the identification information on the information processing apparatus and the identification information on the process requested to be executed, to the server via a virtual private line established with the server; and
- a function of executing the requested process in a case where the execution permission information is returned from the server in response to the transmitted check request.

* * * * *